(No Model.)
E. A. SPERRY.
SYSTEM AND APPARATUS FOR CONTROL OF ELECTRIC MACHINES.
No. 525,395. Patented Sept. 4, 1894.
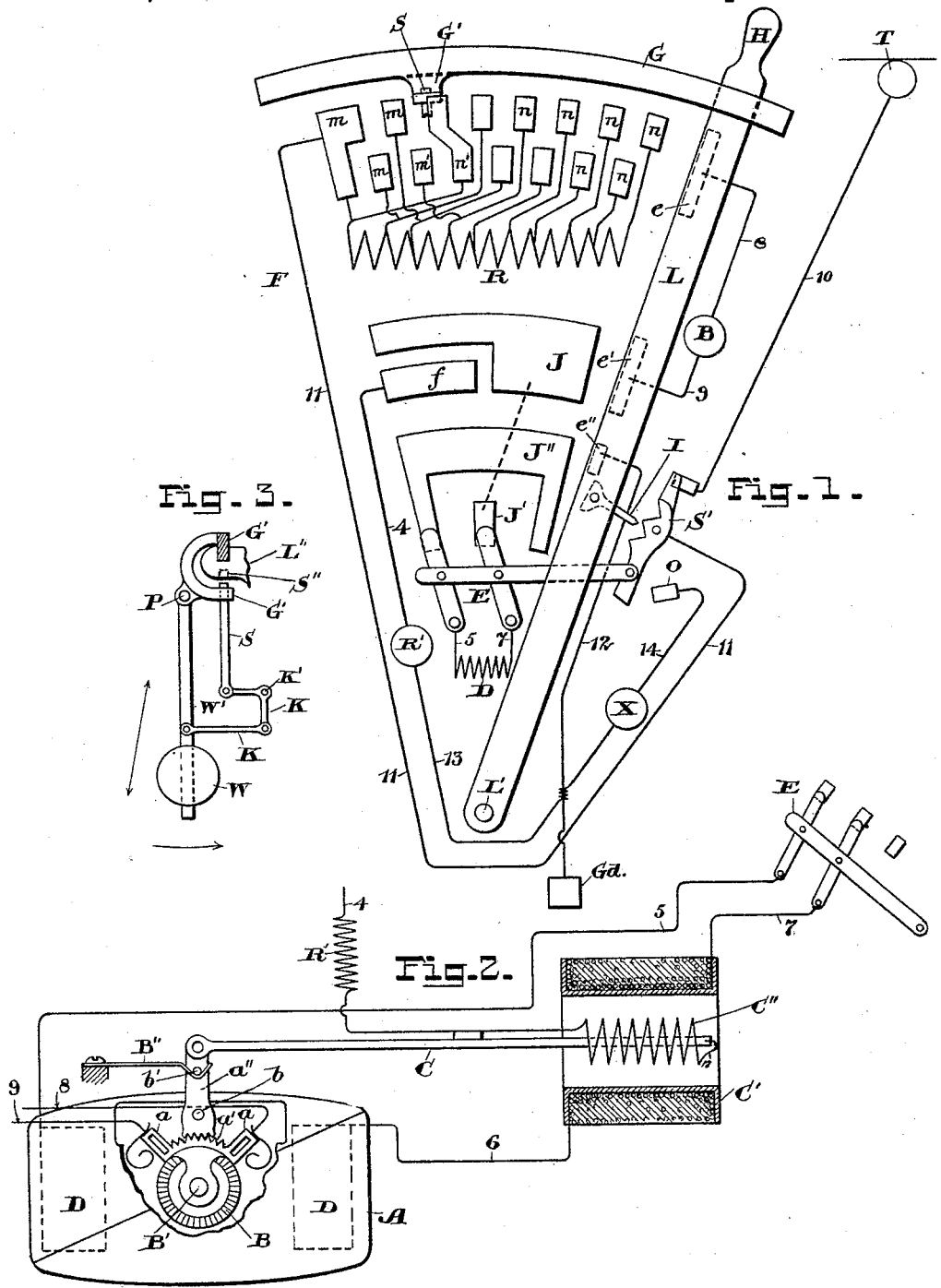
Witnesses.
L. P. Abell
A. H. Abell
Inventor.
Elmer A. Sperry
THE NORRIS PETERS CO., PHOTO-LITHO., WASHINGTON, D. C.

UNITED STATES PATENT OFFICE.

ELMER A. SPERRY, OF CLEVELAND, OHIO, ASSIGNOR TO THE SPERRY ELECTRIC RAILWAY COMPANY, OF OHIO.

SYSTEM AND APPARATUS FOR CONTROL OF ELECTRIC MACHINES.

SPECIFICATION forming part of Letters Patent No. 525,395, dated September 4, 1894.

Application filed July 24, 1894. Serial No. 518,417. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Systems and Apparatus for Control of Electric Machines, of which the following is a specification.

My invention relates to a system and apparatus for control of electric machines, and consists in arrangement of certain details of the electric machine and construction of certain parts, such as commutator brushes, devices for controlling the movement thereof, and mechanism for the current control of such electric machine, all of which are fully described and especially pointed out in the claims hereto annexed.

In electric machines where the inducing capacity at start greatly exceeds the normal or where such capacity is reduced for increasing speed, &c., it has been found that for the best results at the time of changing the inducing capacity certain changes should be made in the position of the commutator brushes owing for instance to the shifting of the so-called neutral point upon the commutator. The present invention relates to an automatic method of securing this change, and when the motor is running in either direction. It has been found that when such machine is used as a motor a large economy in current consumption can be effected in starting. Also, that during excessive loads or during the time of heavy acceleration it is not desirable to alter the inductive capacity or lower the capacity of the motor for generating counter electro motive force at constant speed, and certain automatic devices are introduced to prevent the alteration except when the conditions will permit, for instance, when the motor is used to propel a car on a level track with not too high degree of acceleration.

In the accompanying drawings, Figure 1 illustrates a diagrammatic elevation of the controller; Fig. 2 a diagrammatic view of the motor with commutator brush-operating device; Fig. 3 a detail of the automatic stop.

Like letters and numerals of reference indicate similar parts throughout the several views.

The electric machine or motor A is provided with a commutator B and brushes $a\,a$ mounted upon a yoke revolving around the axis B' of the motor in any suitable manner as by means of the toothed rack $a'$ and co-operating toothed lever $a''$ fulcrumed at $b$ and furnished with a centralizing spring B'' co-operating with pin $b'$. A link C connects the top of the lever $a''$ with the solenoid C' which is shown in circuit with the field magnets D indicated in dotted lines. The core of the solenoid is supplied with a coil C'' grounded at one end on the link C and supplied at the other by wire 4, which may include a resistance R'. The circuit through the motor is from reversing switch E, wire 5, fields D D, wire 6, solenoid C', back to reversing switch E by wire 7. The armature circuits are completed through the brushes $a\,a$ and conductors 8 and 9. In the controller F the main moving part is shown as in the form of a lever L pivoted at L' and supplied with a handle or lever H which slides along the guide G shown in section in Fig. 3, the handle being furnished with a guide L'' forming a part thereof. A stationary portion of the controller G' which may form a part of the guide or segment G serves to guide the stop S, Fig. 3, a portion only of which is shown in Fig. 1. A moving weight W is shown as hung on the rod W' from the point P forming a pendulum, the motion of which is communicated to the stop S by bell crank lever K pivoted at K', and link K''.

The circuits through the apparatus may be traced as follows: When the electric machine is used as a motor the source of current supply may be illustrated by the trolley T and wire 10 to the switch S' which may be actuated by the finger I forming a part of the lever L. The current from this point flows on wire 11 to contact $m$, through the resistance R to the moving contact $e$ upon the lever L through either one of two groups of contacts indicated by $m\,m$, &c., and $n\,n$, &c. The current at this point passes wire 8, commutator B, wire 9, contact $e'$, contact J, contact J', switch E, wire 7, field D, wire 5, contact J'', stationary contact $e''$, wire 12 to ground G$d$.

As the lever L is moved farther to the left the contact e finally reaches the contact n' when all the resistance R is cut out. If the stop S will permit, a still further movement is made whereupon the contact m' is reached, and simultaneous with it the contact e' reaches the contact f whereupon some of the current which has reached the ground through field D and wire 12, now flows over wire 4 through resistance R' to the ground by wire 13 which connects with wire 12 as shown. As the switch S' is thrown to and fro in its well known movement simultaneously with the switch E and the reversal of the field D, the contact O is covered, and the wire 11 is in this manner connected with wire 14 which connects with wire 12 in the well known way and may include the brake or other actuated device X.

Having described the invention, its mode of operation will readily be understood as follows: Supposing the controller F to be attached to a car, the horizontal arrow in Fig. 3 will represent the forward direction of movement of the car. The inertia of the weight W will in this case cause the weight to move to the left. The motion being imparted to the stop S, it will rise and occupy the position shown by S'' and thus prevent the lever L from passing. It will also be seen that when upon a gradit the weight W hanging from pivot P will always tend to assume a vertical position. When the car rises upon the grade its vertical position will be in line of the double-headed arrow, and it will occasion the same lifting of the stop S. When the contact e' reaches contact f the field D is shunted to a more or less extent, and the inducing capacity of the electric machine is thereby decreased, but simultaneously with such decrease means are adopted for decreasing the current supply consisting in resistance R, more of which is now included by the contacts m' and m being placed in connection with the moving contact e. This decrease in inductive capacity may be accomplished in various ways, as for instance by introducing extra self-induction in the circuit where an alternating current motor is used. The machine when used as a motor in connection with the controller may be used for electric brake, as is well known in the art, through the devices shown in connection with the switch S' and finger I. The finger I together with the handle H may serve to adjust the switch S' at the end of each stroke of the handle, as is also well known in the art. The devices shown in Fig. 2 for automatically causing a change in the movement of the brushes of the electric machine A when its inducing capacity is reduced, may operate in either direction in which the machine may be rotating at the time, and in this case a solenoid C' is placed in the circuit of that portion of the electric machine which is reversed when the speed is changed, which determines the direction that the brushes shall take when altered as to position. To further effect this change in direction the core of the solenoid may be separately energized, as by coil C'', which may constitute the entire resistance R', Fig. 1, or an extra resistance shown at R', Fig. 2, may be added. In this case the solenoid will be seen to be inactive and dormant until the circuit through contact f and wire 4 is closed, whereupon the solenoid at once acts.

Many of the functions in the invention may be performed by devices differing considerably in construction from those shown and described without departing from the spirit of the invention, and while it is designed to use all the above features in connection with each other, yet it is obvious that some may be used without the others, and the invention extends to such use.

Having described my invention, what I claim as new, and desire to secure by Letters Patent, is—

1. The combination, with a motor, of a current supply, means for gradually increasing the current in the motor circuit from such supply, up to some predetermined point, means for then decreasing the counter electro motive force at constant speed of such motor and simultaneously decreasing the current flowing in the motor circuit from said supply as compared with that flowing previous to said change in the counter electro motive force, and means whereby the current in the motor circuit may be gradually increased from this point.

2. The combination with a motor, of a current supply, a resistance in the motor circuit, means for gradually decreasing such resistance, up to some predetermined point, means for then more or less suddenly decreasing the counter electro motive force at constant speed of the motor, and simultaneously increasing the resistance in the motor circuit, and means whereby the said resistance may then be again gradually decreased from this point.

3. The combination with a motor, of a controller for such motor, a contact-controlled variable resistance in the circuit of the motor, additional contacts operated by the controller at a predetermined point for decreasing the counter electro motive force of the motor at constant speed, resistance contacts simultaneously operated by the controller for inserting resistance in the motor circuit, additional contacts connected with such resistance whereby same may be afterward gradually removed from the circuit, substantially for the purpose specified.

4. The combination, with a motor having field magnets, of a current supply, means for gradually increasing the current in the motor circuit from such supply, means at some predetermined point during said increase for decreasing the magnetism in said field of the motor, and simultaneously decreasing the current flowing in the motor circuit from such supply as compared with that flowing previous to said change in magnetism, and means whereby the current in the motor circuit may be gradually increased from this point.

5. The combination, with a motor having field magnets and a shunt for said magnets, of a current supply, means for gradually increasing the current in the motor circuit from such supply, up to some predetermined point, means for then closing said shunt, and simultaneously decreasing the current flowing in the motor circuit from such supply as compared with that flowing previous to the closing of the field shunt, and means whereby the current in the motor circuit may be gradually increased from this point.

6. In an electric machine, movable brushes for such machine, means for changing the inducing capacity of the machine at constant speed, in combination with a device for simultaneously shifting said brushes.

7. In an electric machine capable of rotating in either direction, a commutator, movable brushes for such machine, means for changing the inducing capacity of the machine at constant speed, in combination with a device for simultaneously shifting said brushes in either one or the other direction around the commutator dependent upon the direction of rotation of the machine.

8. In an electric machine, movable brushes for such machine, means for changing the inducing capacity of the machine at constant speed, in combination with a device in the circuit of the machine for simultaneously shifting the said brushes.

9. In an electric machine having a field magnet, a shunt for such field in whole or in part, movable brushes for the machine, means for closing said shunt, in combination with a device in circuit with said shunt for simultaneously shifting the brushes.

10. In a controller for an electric machine, a moving part of said controller, and a pendulum-actuated stop for the moving part.

11. In a controller mounted upon a moving machine, a moving part of such controller, a weight mounted to move in a plane parallel to the plane of movement of the machine, a stop for said moving part, and a mechanical connection between the weight and the stop.

12. In a controller for a motor, a moving element of the controller, means connected with the controller for decreasing the inducing capacity of such motor at a predetermined point in the movement of said moving part, and a stop for such controller so located as to arrest the moving part in its excursion just before reaching the aforesaid means.

13. In a controller for a motor, a moving element of the controller, means connected with the controller for decreasing the inducing capacity of such motor at a predetermined point in the movement of said moving part, and an automatic stop for such controller so located as to arrest the moving part in its excursion just before reaching the aforesaid means.

14. On a moving vehicle arranged to ascend grades, a motor controller having a moving part for such vehicle, a stop arranged to arrest the action of the controller at some predetermined point in its excursion, and means called into action by the angle or gradit upon which the vehicle may stand for actuating such stop.

ELMER A. SPERRY.

Witnesses:
M. NIELSON,
F. WAYLAND BROWN.